Oct. 24, 1950     F. M. BURDITT     2,527,395
KITCHEN UTENSIL
Filed April 2, 1948

INVENTOR.
Frederic M. Burditt
BY
J. Stanley Churchill
ATTORNEY

UNITED STATES PATENT OFFICE 2,527,395

KITCHEN UTENSIL

Frederic M. Burditt, Cambridge, Mass., assignor to Yankee Enterprises, Incorporated, Boston, Mass., a corporation of Massachusetts Application April 2, 1948, Serial No. 18,582

1 Claim. (Cl. 99—347)

This invention relates to a kitchen utensil.

The invention has for an object to provide a novel and improved kitchen utensil of novel construction adapted for use as a mold for gelatin desserts or other foods, and which is further adapted for use as a condensing cover for a receptacle containing hot liquids or the like.

With this general object in view and such others as may hereinafter appear, the invention consists in the kitchen utensil hereinafter described and particularly defined in the claim at the end of this specification.

Figure 1:
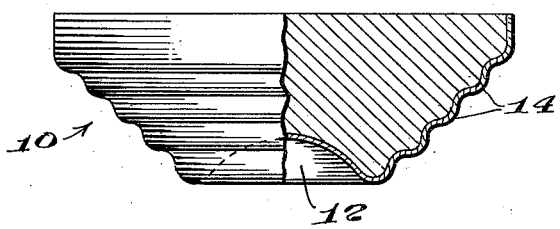
Figure 2:
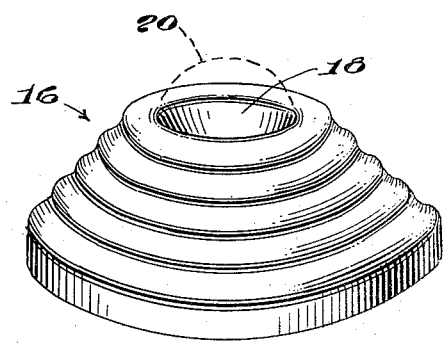
Figure 3:
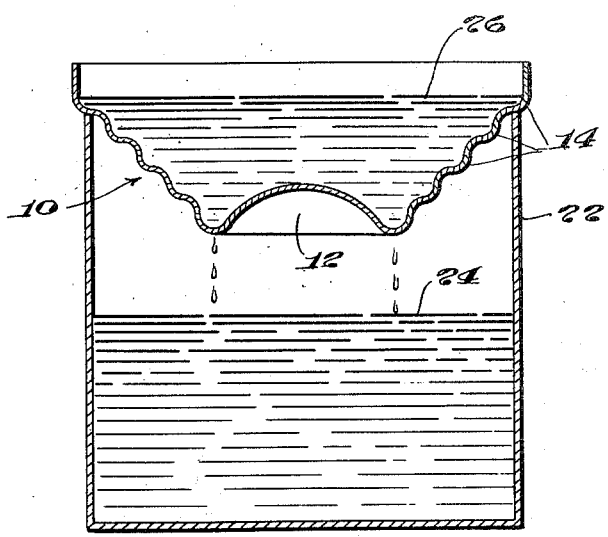

In the drawings illustrating the preferred embodiment of the invention, Fig. 1 is a front elevation, partly in cross section, of a kitchen utensil embodying the present invention, and illustrating its use as a food mold; Fig. 2 is a perspective view of the congealed food removed from the mold; and Fig. 3 is a cross-sectional view of the present utensil illustrating its use as a vapor condenser.

In general, the present invention contemplates a novel kitchen utensil adapted for various uses and which comprises a hollow vessel generally conical in shape, open at its larger end and having a concave depressed portion at the smaller end, the side walls of the conically shaped vessel being formed by a series of concentric stepped ring portions forming a uniformly undulating conical surface.

When used as a mold for a gelatin dessert or other food, the generally conical structure of the utensil with its stepped ring portions, as distinguished from the conventional semi-spherical or bulging type of mold, forms a congealed product which will more readily retain its molded shape without spreading or bulging out when removed from the mold, and the depressed portion at the small end of the cone forms a socket in the molded food for receiving a sauce or other food dressing.

When the illustrated utensil is used as a vapor condenser, the stepped concentric ring construction of progressively increasing diameter from the smaller to the larger end of the cone forms a universal cover capable of being fitted to receptacles of different diameters, the undulating side wall formation also providing a relatively large condensing area on the inner surface extended into the receptacle. In practice, when used as a vapor condenser, the utensil may be supplied with a cooling liquid such as cold water to assist the condensation process, the condensed vapors falling back into the receptacle. As thus used, the vapor condensing cover eliminates waste, reduces cooking odors, and conserves the flavor of the cooked food. The utensil so used as a vapor condensing cover for a cooking receptacle and provided with a coolant, the cover serves to create a pressure cooking action as well as a condensing action within the receptacle. The amount, temperature and weight of the coolant may be varied as desired to control the cooking process.

Referring now to the drawings, the illustrated utensil, indicated generally at 10, comprises a one-piece, hollow and generally conically shaped vessel open at its larger end and having a concave vapor-collecting dome portion 12 at its smaller end. The generally conical side wall surfaces are formed by a series of stepped concentric ring portions 14 to provide a uniformly undulating conical surface. The utensil may be made from thin sheet metal, glass, plastic, or other suitable material.

In using the utensil as a food or dessert mold, as illustrated in Fig. 1, the prepared foodstuff in its preliminary or liquid state is poured or pressed into the vessel 10 and cooled, cooked or congealed. The resulting foodstuff 16, as illustrated in Fig. 2, comprises a concentrically ringed conically shaped form having undulating side wall surfaces and having a cavity or pocket 18 at its upper end into which a sauce, whipped cream, or other secondary foodstuff 20, may be placed and retained.

Referring now to Fig. 3, when the present utensil 10 is used as a vapor condensing cover for a cooking vessel or other receptacle 22 containing hot vapor producing foods or liquids 24, the concentric ring portion 14 corresponding to the diameter of the receptacle rests on the upper edge of the receptacle to form a seal. The utensil may then be partially filled with cold water or other coolant 26 to assist condensation of vapors arising from the hot liquid 24, the undulating surface 14 and concave dome portion 12 forming a relatively large condensing area from which the condensate may drip back into the receptacle, as illustrated. The dome 12 is actually of concavo-convex form and causes the coolant 26 to assume a ring-like shape in the lowermost portion of the utensil 10 nearest the hot liquid 24, whereby the relatively small volume of coolant surrounding the dome 12 in the region is first heated and convection currents produced to induce circulation in the body of coolant 26 for effective condensation of vapors in the cooking vessel 22.

While the preferred embodiment of the invention has been herein illustrated and described, it will be understood that the invention may be embodied in other forms within the scope of the following claim.

Having thus described the invention, what is claimed is:

As a new article of manufacture, a kitchen utensil for use as a vapor condensing cover, comprising: a one-piece, hollow, generally inverted cone-shaped vessel open at its upper end and having a conical side wall, and a deep inwardly-dished concave bottom wall at its lower end, said vessel being adapted to receive a coolant therein for condensing cooking vapors, the conical side wall of the vessel being formed with a plurality of stepped concentric ring portions having curved edges and of progressively increasing diameter from the lower to the upper end of the cone providing an undulating side wall surface, the stepped formation of the curved-edge concentric ring portions being self-seating to fit receptacles of different diameters and also providing an increased condensing area, and said concave bottom wall providing a vapor collecting dome which in use is surrounded at its base by a ring-shaped body of said coolant which latter is adapted to be heated first to induce circulation in the coolant by convection, whereby to effect efficient condensation of cooking vapors.

FREDERIC M. BURDITT.

REFERENCES CITED

The following references are of record in the file of this patent:

UNITED STATES PATENTS

| Number | Name | Date |
|---|---|---|
| 656,855 | Pimlett | Aug. 28, 1900 |
| 2,346,631 | Wille | Apr. 11, 1944 |

FOREIGN PATENTS

| Number | Country | Date |
|---|---|---|
| 216,654 | Switzerland | Dec. 16, 1941 |
| 799,836 | France | June 20, 1936 |